DIODE RANDOM NOISE GENERATOR

Filed June 11, 1963

INVENTOR
ERWIN HIRSCHMANN
GEORGE N. KAMBOURIS

BY Harry M. Saragovitz, Edward J. Kelly, Herbert Berl & J. P. Edgerton

ATTORNEYS.

3,171,089

DIODE RANDOM NOISE GENERATOR

Erwin Hirschmann, Greenbelt, and George N. Kambouris, Bethesda, Md., assignors to the United States of America as represented by the Secretary of the Army Filed June 11, 1963, Ser. No. 287,156
6 Claims. (Cl. 331—78)
(Granted under Title 35, U.S. Code (1952), sec. 266)

The invention described herein may be manufactured and used by or for the Government of the United States of America for governmental purposes without the payment to us of any royalty thereon.

This application is a continuation-in-part of presently pending application Serial No. 172,360, filed by George N. Kambouris on February 9, 1962.

This invention relates to the field of electrical noise signal generators and more particularly to noise generators utilizing the reverse breakdown characteristic of avalanche diodes.

In the said parent application there is disclosed a nonperiodic pulse generator which operates by maintaining an avalanche diode in the unstable area of its reverse breakdown characteristic. That device is capable of producing a reasonable approximation of a random noise signal. However, it is unable to achieve a true random output because, although the pulses produced have random amplitudes and pulse periods, they all have identical slopes, the value of which depends on the bias level as well as on load conditions.

It is therefore an object of this invention to generate a random noise signal comprising pulses having random slopes as well as randomly varied pulse heights and widths.

It is another object of this invention to generate a noise signal in a system having a small number of components and occupying a minimum of space.

Yet another object of this invention is to generate a random signal by utilizing the noisy reverse breakdown characteristic of the avalanche diode.

These and other objects, features and advantages of the present invention will become more readily apparent from the ensuing description taken in connection with the drawings in which.

As has been fully described in the said parent application, a noise signal is produced when an avalanche diode is biased in the noisy region at the knee of its reverse breakdown characteristic. It has been found that the noise signal produced consists of a series of pulses having random amplitudes and periods, but having identical slopes. The pulses produced in such a system may be linear or nonlinear but, at any given diode bias level, all of the pulses will have the same shape; i.e., they could each be described by the same equation. Although this is true for any bias level, the steepness of the pulse slopes will vary with varying bias levels in the noisy region. This invention seeks to take advantage of this fact by utilizing two such avalanche diodes in such a manner that the random pulse output of the first diode varies the bias level of the second diode within its noisy reverse breakdown region. The output of the second diode is thus a noise signal having random variations in the slopes of the output pulses, as well as having randomly varying pulse amplitudes and periods.

Figure 1A:
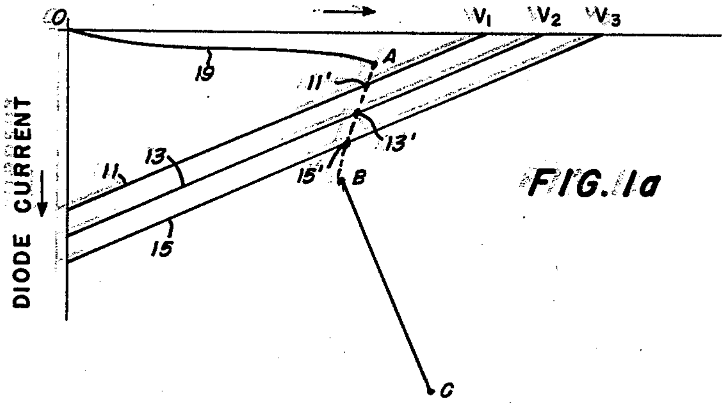
FIG. 1 is a series of curves useful in describing the operation of this invention.
Figure 1B:
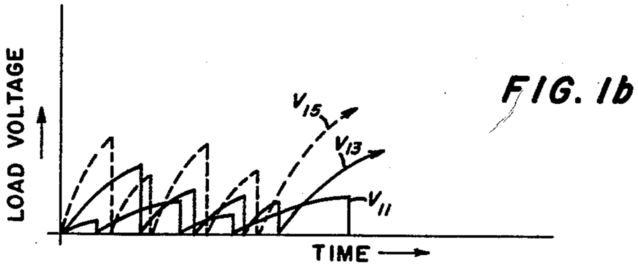

FIG. 1*a* is a voltage vs. current diagram of the reverse characteristic of an avalanche diode. The curve 19 represents the characteristic, with the segment OA representing the high impedance portion thereof, the segment AB representing the noisy reverse breakdown portion and the segment BC representing the stable portion of the breakdown characteristic. The lines 11, 13 and 15 are load lines for various diode voltages, the load lines being numbered in the order of increasing bias voltage. The respective load lines cause the diode to operate at the points 11′, 13′ and 15′, respectively. The voltages produced at these points is shown in FIG. 1*b* which shows three curves representing the output signals from an avalanche diode for three different bias levels within its unstable reverse breakdown region. These curves are typical of the experimentally derived outputs of a noise generator utilizing a single diode. The subscripts on the symbols representing these waveforms correspond to similarly numbered points on the curve 19 of FIG. 1*a*. Inspection of FIG. 1*b* will show that for a given load resistance, an increase in the bias voltage will cause the slopes of the noise signal pulses to increase.

Figure 2:
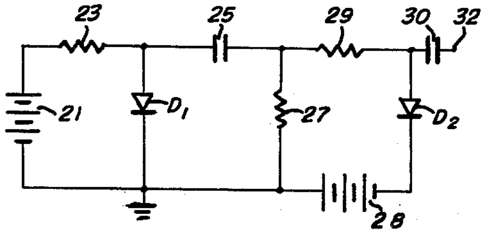
FIGS. 2, 3 and 4 are schematic diagrams of preferred embodiments of this invention.

It should now be evident that if the bias voltage applied to an avalanche diode were to be randomly varied while being maintained within a range which permits the diode to continuously operate within its unstable reverse breakdown region, the resulting noise signal would have randomly varying pulse slopes. One circuit for accomplishing this objective is shown in FIG. 2 wherein the noise output of diode $D_1$ randomly varies the bias voltage of diode $D_2$. In this circuit the power supply 21 and bias resistor 23 are chosen to have values which will bias the diode $D_1$ so as to cause it to operate somewhere in its noisy reverse breakdown region. Coupling capacitor 25 acts as a high pass filter for conducting only the noise voltage output from the diode $D_1$. This noise voltage is impressed across the load resistor 27. The voltage level of bias supply 28 and the resistances of resistors 27 and 29 are chosen so that the diode $D_2$ operates in the noisy portion of its reverse breakdown region. When the noise output from diode $D_1$ is impressed across resistor 27 the voltage on this resistor serves to vary the voltage across the series combination of resistor 29 and diode $D_2$, thus varying the point on its characteristic at which diode $D_2$ operates. When the diodes are properly selected the voltages across resistor 27 will be such that the diode $D_2$ continually operates somewhere within its noisy reverse breakdown region with the result that the point on its noisy reverse breakdown characteristic at which diode $D_2$ operates is varied in a random manner. This causes the output from diode $D_2$ to consist of a series of pulses having randomly varying slopes. The noise output from diode $D_2$ is conducted through capacitor 30, which acts as a second high pass filter, and appears at output terminal 32.

The desired operation of this circuit is easily achieved by the procedure of selecting resistors 27 and 29 and battery 28 so as to attain a load line such as that indicated by reference numeral 13 of FIG. 1*a*. If the voltage across resistor 27 due to the noise output of diode $D_1$ were such that the total voltage varies between the values $V_1$ and $V_3$ of FIG. 1*a* then the diode $D_2$ would always operate somewhere within its noisy breakdown region.

Figure 3:
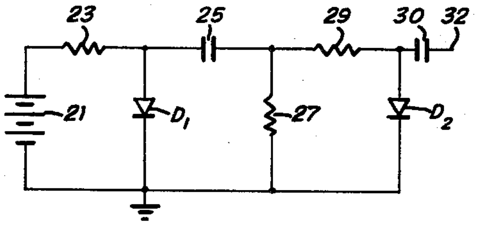

A second embodiment of this invention, which represents a simplification of the embodiment described above, is shown in FIG. 3. This circuit operates in the same manner as that of FIG. 2 but has no constant bias voltage supply for the diode $D_2$. The diodes are selected so that the diode $D_2$ undergoes reverse breakdown at a very low voltage. With such a diode the noise voltage appearing across resistor 27 may be sufficient to bias the diode $D_2$ into its reverse noisy breakdown region. The result would be a randomly occurring train of random noise signal pulses.

Another embodiment of this invention is shown in

Figure 4:
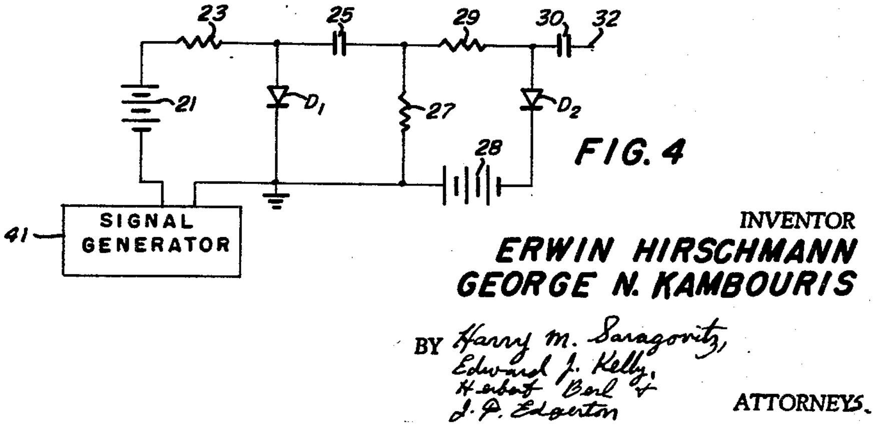

FIG. 4. This figure shows the basic circuit of FIG. 2, with corresponding elements bearing corresponding reference symbols. An additional element, signal generator 41, is shown connected in series with voltage source 21 and resistor 23. This signal source serves to vary the bias voltage applied to diode $D_1$ so that the slopes of the pulses of the noise signal produced by diode $D_1$ are continuously varied. The signal generator 41 may be adapted to produce triangular waves, sinusoidal waves, or any other arbitrary wave form. This procedure introduces an additional randomness into the noise signal inserted across resistor 27, thus compounding the random nature of the noise signal produced by the diode $D_2$. Any well-known signal generator may be used.

The methods of determining the proper values of components for the various embodiments described above should be obvious to one skilled in the art and are not described in detail here. The simplest procedure for deriving these values would appear to involve the use of a load line diagram similar to that of FIG. 1*a*.

It will be apparent that the embodiments shown are only exemplary and that various modifications can be made in construction and arrangement within the scope of the invention as defined in the appended claims.

We claim as our invention:

1. A random noise generator comprising:
   (*a*) random pulse generator means for generating a series of pulses having random amplitudes and periods, said pulses having slopes proportional to a bias voltage applied to said random pulse generator means;
   (*b*) randomly variable bias voltage means connected to said random pulse generator means for continuously varying the amplitude of the applied bias voltage to said random pulse generator means;
   (*c*) whereby the output of said pulse generator is a signal having a random amplitude, repitition rate and slope.

2. A random noise generator as recited in claim 1 wherein said random pulse generator comprises an avalanche diode.

3. A random noise generator as recited in claim 2 wherein said randomly variable bias voltage means includes a second avalanche diode.

4. A diode random noise generator comprising;
   (*a*) a pair of diodes each of which has a reverse impedance breakdown region which has an unstable portion;
   (*b*) a pair of fixed-voltage bias supplies each of which is connected to a respective one of said diodes, the voltage produced by each of said supplies being of a value sufficient to maintain its respective diode in the said unstable portion of its reverse region; and
   (*c*) connector means connecting said two diodes to superimpose the random signal produced by one of said diodes upon the bias voltage to the other of said diodes.

5. A diode random noise generator as recited in claim 4 further comprising a repetitive waveform signal generator connected to the said bias supply associated with said one of said diodes to superimpose said repetitive signal upon said voltage produced by said supply.

6. A random noise generator comprising:
   (*a*) an avalanche diode back biased into its unstable reverse impedance breakdown region, and
   (*b*) a second avalanche diode connected to said first avalanche diode and randomly biased by the output from said first diode into its unstable reverse breakdown region.

References Cited by the Examiner

UNITED STATES PATENTS

| | | | |
|---|---|---|---|
| 2,773,186 | 12/56 | Herrmann | 331—78 |
| 2,848,612 | 8/58 | Allison | 331—78 |
| 2,997,662 | 8/61 | Garner | 331—78 |

ROY LAKE, *Primary Examiner.*

JOHN KOMINSKI, *Examiner.*